US008026640B2

(12) United States Patent
Bott et al.

(10) Patent No.: US 8,026,640 B2
(45) Date of Patent: Sep. 27, 2011

(54) ELECTRIC MACHINE HAVING A ROTARY AND A LINEAR ACTUATOR

(75) Inventors: Erich Bott, Hollstadt (DE); Rolf Vollmer, Gersfeld (DE); Matthias Braun, Weichtungen (DE); Holger Schunk, Lendershausen (DE)

(73) Assignee: Siemens Aktiengesellschaft, München (DE)

( * ) Notice: Subject to any disclaimer, the term of this patent is extended or adjusted under 35 U.S.C. 154(b) by 493 days.

(21) Appl. No.: 11/719,922

(22) PCT Filed: Nov. 16, 2005

(86) PCT No.: PCT/EP2005/056007
§ 371 (c)(1),
(2), (4) Date: Aug. 4, 2009

(87) PCT Pub. No.: WO2006/056548
PCT Pub. Date: Jun. 1, 2006

(65) Prior Publication Data
US 2009/0295236 A1 Dec. 3, 2009

(30) Foreign Application Priority Data
Nov. 22, 2004 (DE) .......................... 10 2004 056 212

(51) Int. Cl.
*H02K 41/02* (2006.01)
(52) U.S. Cl. ..................................... 310/12.14; 310/15
(58) Field of Classification Search ............... 310/12.14, 310/14–17
See application file for complete search history.

(56) References Cited

U.S. PATENT DOCUMENTS

| 3,688,592 A | 9/1972 | Kopczynski |
| 3,696,251 A * | 10/1972 | Last et al. .................... 290/53 |
| 4,500,141 A | 2/1985 | Daugherty et al. |
| 4,511,188 A | 4/1985 | Walter et al. |
| 5,713,281 A | 2/1998 | Hummel et al. |
| 6,137,195 A * | 10/2000 | Chitayat .................... 310/12.24 |
| 6,429,611 B1 * | 8/2002 | Li ................................ 318/115 |
| 6,570,275 B2 * | 5/2003 | Kim et al. ................. 310/12.14 |
| 2002/0047367 A1 | 4/2002 | Kim et al. |
| 2002/0149279 A1 | 10/2002 | Bartoletti |
| 2004/0155539 A1 | 8/2004 | Potoradi et al. |

FOREIGN PATENT DOCUMENTS

| DD | 253 331 | 1/1988 |
| DE | 87 11 725 | 10/1987 |

(Continued)

*Primary Examiner* — Thanh Lam
(74) *Attorney, Agent, or Firm* — Henry M. Feiereisen; Ursula B. Day

(57) ABSTRACT

The invention relates to an electric machine which comprises a first machine part (30), comprising a stator element (31) and a rotor element (32) and being configured as a rotary actuator which interacts with a rotary movement of the rotor element (32). The electric machine (40) also comprises a second machine part (20), comprising a primary part (1) and a secondary part (2) and being configured as a linear actuator which interacts with a linear movement of the secondary part (2). The rotor element (32) of the first machine part (30) and the secondary part (2) of the second machine part (20) are interlinked. The secondary part (2) of the second machine part (20) can be rotated and is configured as an external rotor. Such a secondary part (2) allows to generate a higher power of a secondary machine part (20) acting as the linear motor. The secondary part (2) is mounted in the center thereof in relation to the primary part (1).

18 Claims, 1 Drawing Sheet

FOREIGN PATENT DOCUMENTS

| | | |
|---|---|---|
| DE | 102 13 679 | 10/2003 |
| DE | 102 44 428 | 6/2004 |
| DE | 103 24 601 | 12/2004 |
| WO | WO 02/063749 | 8/2002 |

\* cited by examiner

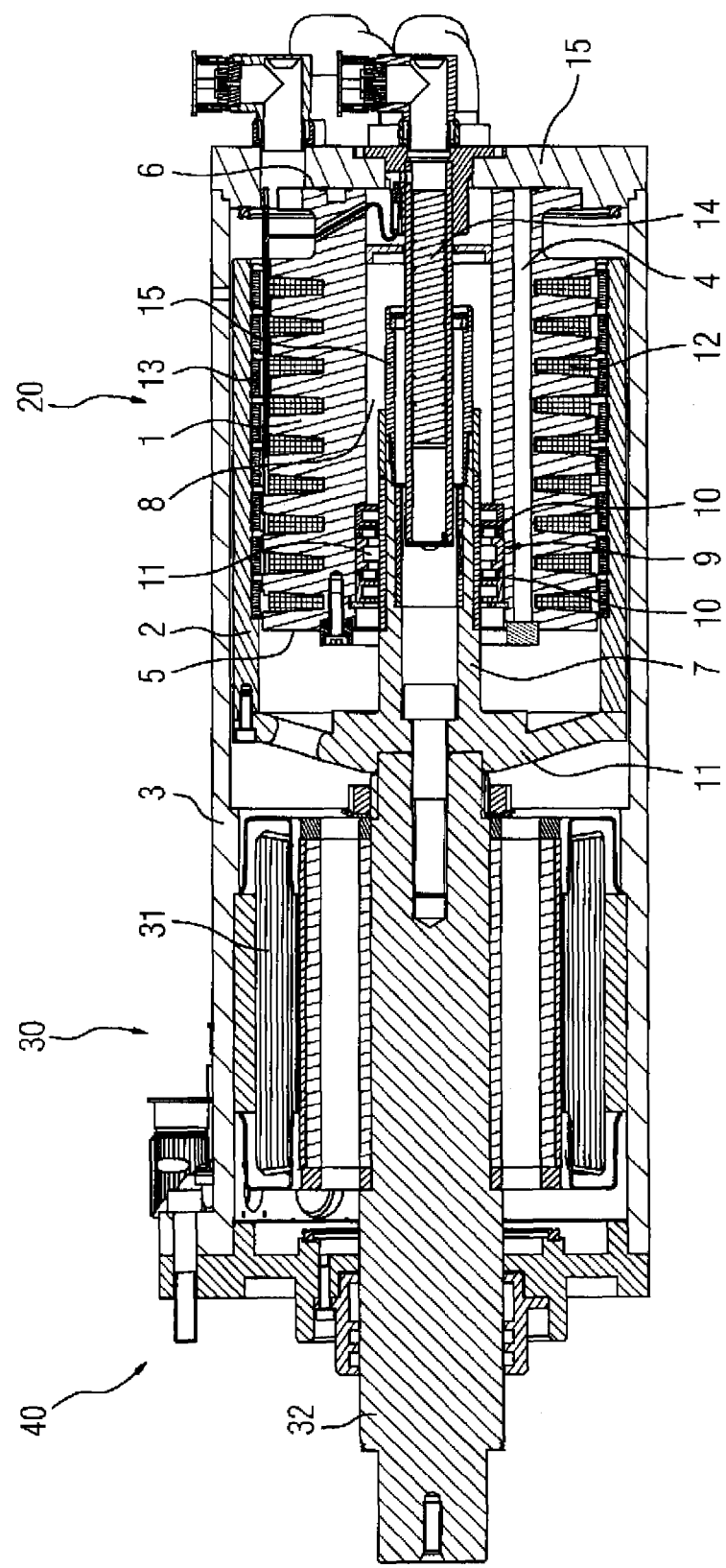

ELECTRIC MACHINE HAVING A ROTARY AND A LINEAR ACTUATOR

BACKGROUND OF THE INVENTION

The present invention relates to an electric machine having a first machine part, which comprises a rotary actuator, and having a second machine part, which comprises a linear actuator.

Electric machines of the type mentioned at the beginning are used, in particular, as drive devices in machine tools or as roller drive devices, for example in printing machines. Such machines principally require high dynamics, for example when a tool such as a milling machine is to be moved both in a rotary fashion and in a linear one. The aim here is to implement a linear movement in addition to a rotary one, in particular without switching gear and at high feed rates and with high precision.

By way of example, use is made for such an application of electric machines that both have a rotary actuator for converting a rotary driving movement, and have a linear actuator for converting a linear driving movement. Use is made for this purpose of, for example, electric machines that have appropriate different machine parts. For example, a first machine part includes a stator element and a rotor element that, by interacting with the stator element, ensures a rotary drive oft for example, a tool fastened on the rotor element. The stator element is accommodated in a stator of the electric machine that is at rest mechanically. A rotor, by contrast, includes the rotor element that is, in particular, fastened on a rotating shaft. The stator is generally designed as a hollow cylinder in whose interior the rotor is accommodated as a solid cylinder. The stator element of the stator includes the stator windings that, when flowed through by current, produce the main magnetic field, which interacts with the exciting field produced by the rotor windings or by permanent magnets in the rotor element.

Such a first machine part designed as rotary actuator is connected to a second machine part that, as linear actuator, ensures a linear movement of the shaft fastened to the rotor element of the first machine part. The second machine part comprises, in particular, a primary part with electrical windings that produce the main field, and a secondary part, which is, for example, fitted with permanent magnets, for producing the exciting field. The individual phases of the windings of the primary part are energized with the aid of three current profile curves resembling sinusoidal ones, and give rise to a so-called moving field leading to a linear movement of the secondary part.

The primary part of such a second machine part is generally designed as a hollow cylinder, in a way similar to the stator element of a rotary electric machine, while the secondary part, in a way similar to the rotor element of a rotary electric machine, is designed as a solid cylinder that is arranged in the interior of the hollow cylinder of the primary part. Owing to the restricted installation conditions in a machine tool, for example, and to the implementation of high feed forces, the efficiency of the linear motors used therein is generally already greatly exploited. The result of this is that known linear motors are capable of implementing high feed forces only to a limited extent, because of a limited linear force.

SUMMARY OF THE INVENTION

It is the object of the present invention to specify an electric machine of the type mentioned at the beginning with the aid of which it is possible to attain relatively high feed forces by means of the machine part designed as linear actuator.

The electric machine according to the invention comprises a first machine part, which comprises a stator element and a rotor element and is designed as a rotary actuator interacting with a rotary movement of the rotor element, and a second machine part, which comprises a primary part and a secondary part and is designed as a linear actuator interacting with a linear movement of the secondary part. The rotor element of the first machine part and the secondary part of the second machine part are interconnected. The secondary part of the second machine part can be moved in a rotating fashion and is designed as an external rotor. According to the invention, the secondary part of the second machine part has a centrally arranged, pin-type or tube-type element or a bore extending axially, with the aid of which element/bore the secondary part is supported in a radial direction with reference to the primary part.

With the aid of a secondary part of the second machine part that is designed as an external rotor, it is possible to implement a higher force of a second machine part acting as linear motor, since it becomes possible to enlarge the air gap area of the linear motor without enlarging the external dimensions of the electric machine. This can be achieved by virtue of the fact that it is possible to accommodate in the primary part of the second machine part the electrical windings that produce the main field, whereas permanent magnets for producing the exciting field are accommodated in the secondary part of the second machine part. Since the primary part is provided in the interior of the second machine part, while the secondary part is designed as an external rotor, preferably as a thin hollow cylinder, it is possible to attain larger external dimensions of the primary part such that a larger air gap area can also be provided by means of a larger diameter of the primary part. Owing to such an arrangement, higher magnetic drive forces are produced on the secondary part during operation of the machine such that the force of the linear drive can be increased. A further advantage of the external rotor arrangement resides in the fact that it is technically simpler to apply the electrical windings to the primary part, since the electric conductors can be wound onto the primary part from outside.

For the case in which the primary part is designed as a hollow cylinder and encloses a cavity, the pin-like or tube-like element projects in axial extent into the cavity of the primary part and is supported in this position with reference to the primary part. For example, the pin-like or tube-like element is fastened to the secondary part at an end face of the secondary part of the second machine part at which the secondary part is connected to the rotor element of the first machine part. An arrangement of such a type enables the provision of a bearing with the aid of the pin-like or tube-like element in the cavity of the primary part, and so there is no need to provide the secondary part with a bearing directly on the outside diameter of the primary part, something which can generally be achieved technically only with difficulty. For the purpose of bearing on the primary part, the secondary part can also have a bore, and the primary part a corresponding pin or the like.

In accordance with one advantageous embodiment of the invention, the primary part of the second machine part has a larger outside diameter than the rotor element of the first machine part. This enables the first machine part as rotary actuator to be provided in a conventional way with an external fixed stator element and with a rotor element designed as an internal rotor, the rotor element being connected to the secondary part, designed as an external rotor, of the linear actuator.

The pin-like or tube-like element is supported with reference to a primary part by means of a plain bearing or a ball bearing, by way of example. In another embodiment, the pin-like or tube-like element is supported with reference to the primary part by means of a cylindrical roller bearing, which is advantageous, in particular, when the aim is to achieve high rotational speeds but only low axial speeds of the electric machine.

In one development of the invention, a gap seal is provided between the pin-like or tube-like element and the primary part in order to seal the bearing against penetrating foreign matter. Such a gap seal is constructed, for example, in one or more stages, and in the multistage design a number of seals, in particular on both sides of the bearing, are respectively provided between the pin-like or tube-like element and the primary part in an axial direction of the machine.

Owing to the restricted installation conditions in a machine tool, for example, and to the high power density of a linear motor, the installation of a cooling device in the primary part of the second machine part is advantageous. In particular, guides are provided for conducting a liquid coolant through, for example for conducting cooling water through, which are arranged in an interior of the primary part. This can easily be achieved by providing in an interior of the primary part longitudinal bores that extend in an axial direction of the primary part in order to export heat axially from the primary part. Such longitudinal bores are advantageously interconnected in meandering fashion at the end faces of the primary part.

In another embodiment of the invention, the cooling device comprises so-called heat pipes that are arranged in the interior of the primary part in order to export heat axially from the primary part. A heat pipe is a device that already conducts relatively large quantities of heat given small temperature differences between generally the ends of said heat pipe which is self-enclosed. Heat pipes are, for example, a part of evacuated tubes whose inner walls are clad with a porous layer having a capillary structure. This layer is impregnated with a low-boiling liquid. The liquid evaporates at the warmer tube end and in so doing absorbs the heat of evaporation, then being condensed at the cooler end and releasing the heat of evaporation. Owing to the capillary action of the inner wall, the condensate flows back again to the warmer tube end.

Furthermore, so-called cool jets are suitable for exporting heat axially from the primary part. These are blind bores that are arranged in the interior of the primary part and respectively contain a tube arrangement in which a liquid coolant can be introduced into the respective blind bore and can be removed from the respective blind bore, in order to export heat axially from the primary part.

Further advantageous refinements and developments of the invention are specified in subclaims.

BRIEF DESCRIPTION OF THE DRAWING

The invention is explained in more detail below with the aid of the FIGURE illustrated in the drawing. Here, the FIGURE shows an advantageous embodiment of an electric machine in accordance with the invention.

DETAILED DESCRIPTION OF PREFERRED EMBODIMENTS

The FIGURE illustrates an embodiment of an electric machine for implementing a combined rotary and linear drive. The electric machine 40 has a first machine part 30 that has in a stator a stator element 31 with a stator winding (not illustrated in more detail in the FIGURE). The stator of the machine part 30 is designed as a hollow cylinder, there being arranged in the interior of the hollow cylinder a rotor element 32 that is connected to a shaft and can be moved in a rotating fashion. The stator winding of the stator element 31 produces, for example, the main field of the machine part 30, while an exciter winding or alternatively permanent magnets is/are arranged on the rotor element and serve to produce the exciting field. The machine part 30 therefore acts generally as a rotary actuator interacting with a rotary movement of the rotor element 32. In motor mode, the rotor element 32 with the shaft attached thereon is set moving by the stator field, whereas in generator mode, the movement of the rotor element 32 produces an electric current in the stator winding of the stator element 31.

The electric machine 40 in accordance with the FIGURE has, furthermore, a second machine part 20, which is, in contradistinction to the machine part 30, designed as a linear actuator interacting with a linear movement of a secondary part. The machine part 20 comprises a cylindrical primary part 1 to which electrical windings 12 in individual slots of the primary part 1 are applied. These are individual phases that are connected to an electrical supply network and are energized with the aid of different current profile curves resembling sinusoidal ones. A moving field is built up in this way in an axial direction of the electric machine 40. Moreover, the machine part 20 comprises a secondary part 2 that can be moved in a rotating fashion and is designed as an external rotor. The secondary part 2 is designed in the form of a hollow cylinder open in an axial direction, and is connected to the rotor element 32 of the machine part 30 via the connecting element 11. Arranged on the inside of the secondary part 2 are a number of permanent magnets 13 that serve to build up an exciting field. The machine part 20 therefore acts as a linear actuator interacting with a linear movement of the secondary part 2. As a consequence of the moving field that is produced by the windings 12 of the primary part 1, in motor mode, the secondary part 2 is moved in an axial direction of the electric machine 40, whereas in generator mode a voltage or a current is produced in the electrical windings 12 of the primary part 1 by linear movement of the secondary part 2 in an axial direction.

In the present embodiment, the secondary part 2 of the machine part 20 has a centrally arranged, pin-like element 7 that extends in an axial direction of the electric machine 40. The pin-like element 7 extends in an axial direction into a cavity 8 of the primary part 1, and is supported in a radial direction in the cavity 8 of the primary part with reference to the latter by means of a bearing 9. Here, the pin-like element 7 is fastened to the exterior of the secondary part 2 via the connecting element 11, which is located at an end face of the secondary part 2. Consequently, the pin-like element 7 is axially aligned with the rotor element 32 of the machine part 30.

Depending on what is required in the individual case, the bearing 9 can be designed as a plain bearing with a hydrostatic bearing, as a ball bearing or as a cylindrical roller bearing. The latter embodiment is of particular advantage when high rotational speeds, but only low axial speeds of the electric machine are to be achieved. The other side of the bearing is located at the inner wall of the primary part 1, which faces the cavity 8 and is therefore permanently connected to the housing 3 of the electric machine 40 via the primary part 1. Such a bearing of a pin-like element in the interior of the primary part 1 is to be preferred to a bearing directly on the outside diameter of the primary part 1 from a technical point of view, since the latter is not possible, or possible only with difficulty, in technical terms.

A gap seal 10 is provided between the pin-like element 7 and the primary part 1 in order to seal the bearing 9 against penetrating foreign matter or escaping grease. This is advantageous from a technical point of view, since known contact sealing systems fail owing to the axial movement of the secondary part 2 with the pin-like element 7. The gap seal 10 is advantageously constructed in a number of stages, a number of seals 10 respectively being provided in an axial direction of the electric machine 40 between the pin-like element 7 and the primary part 1, which are here arranged on both sides of the bearing 9.

The primary part 1 is annularly connected to a cover 15 that, for its part, is fastened to the housing 3. Hence, the primary part 1 is annularly connected to the housing 3 via the cover 15. Consequently, heat that is to be exported can be exported from the primary part 1 only via this annular surface between the primary part 1 and cover 15. As a result, it is possible to attain an only comparatively low heat flux from the primary part 11 and so only comparatively low powers of the linear drive are rendered possible overall. For this reason, the primary part 1 of the machine part 20 has a cooling device that comprises in the present embodiment longitudinal bores 4 that are arranged in an axial direction in an interior of the primary part 1 in order for waste heat produced to be exported axially from the primary part 1 via a cooling liquid in the form of water. These longitudinal bores 4 are interconnected in a meandering fashion on the end faces 5 and 6 of the primary part 1. In accordance with another embodiment, heat pipes are also suitable for conducting the waste heat produced axially outward from the primary part 1 and dissipating it to the surroundings via a heat sink at the cover 15. It is possible here for the heat pipes to be provided in a similar arrangement to the longitudinal bores 4 in the interior of the primary part 1.

In a further advantageous embodiment, the cooling device comprises blind bores, so-called cool jets, that are arranged in an interior of the primary part and respectively contain a tube arrangement in which a liquid coolant can be introduced into the respective blind bore and can be removed from the respective blind bore, in order to export heat axially from the primary part 1. Cooling water flows into such a blind bore and emerges from the blind bore in a heated fashion.

It is possible with the aid of such a cooling device in the interior of the primary part 1 to attain in combination with the pin-like element 7 and its bearing in the cavity 8 the further advantage that the bearing 9 is always located in a well-cooled region, since the bearing is decoupled from the thermal loading of the winding 12 owing to the cooling device in the primary part. Furthermore, the transmitter 14 arranged in the cavity 8 also profits from the lower thermal loading in the cavity 8, since the latter is likewise decoupled from the thermal loading of the winding 12 in the primary part 1 by means of the cooling device. The transmitter 14 has the function in this case of detecting the axial position of the secondary part 2.

Owing to the larger outside diameter of the primary part 1 as compared with the outside diameter of the rotor element 32 of the machine part 30, it is possible to attain a larger air gap area between the primary part 1 and secondary part 2 such that the force attainable with the linear drive can be substantially increased by comparison with an arrangement of a secondary part as internal rotor. A further advantage of the arrangement according to the invention consists in that the windings 12 of the primary part 1 can be applied comparatively simply from outside, and this has a cost-effective influence on the production of the electric machine.

The electric machine 40 in accordance with the invention can be used with particular advantage in a roller drive device that is, for example, included in a printing machine. In this context, the electric machine 40 serves, for example, as a motorized drive device for driving a roller, to be moved in rotary and linear fashions, of the printing machine. In a further advantageous embodiment, the electric machine in accordance with the invention is used in a machine tool drive device, in order as a motorized drive device to drive a tool, to be moved in rotary and linear fashions, of a machine tool.

What is claimed is:

1. An electric machine, comprising:
   a first machine part including a stator element and a rotor element and constructed as a rotary actuator which interacts with a rotary movement of the rotor element; and
   a second machine part including a primary part and a secondary part and constructed as a linear actuator which interacts with a linear movement of the secondary part,
   wherein the rotor element of the first machine part and the secondary part of the second machine part are interconnected,
   wherein the secondary part of the second machine part is moveable in a rotating fashion and constructed as an external rotor, and
   wherein the secondary part of the second machine part has a central pin-type or tube-type element or an axial bore, for support of the secondary part in a radial direction in relation to the primary part, wherein the primary part of the second machine part includes a cavity, wherein the pin-like or tube-like element has an axial length sufficient to project into the cavity of the primary part, and wherein the pin-like or tube-like element is supported in the cavity of the primary part in relation to the primary part.

2. The electric machine of claim 1, wherein the primary part of the second machine part has an outside diameter which is greater than an outside diameter of the rotor element of the first machine part.

3. The electric machine of claim 1, wherein the pin-like or tube-like element is attached to an end face of the secondary part of the second machine part, with the secondary part being connected at the end face to the rotor element of the first machine part.

4. The electric machine of claim 1, wherein the pin-like or tube-like element is supported in relation to the primary part by means of a bearing unit.

5. The electric machine of claim 4, wherein the bearing unit is selected from the group consisting of plain bearing, ball bearing, and cylindrical roller bearing.

6. The electric machine of claim 4, further comprising a gap seal provided between the pin-like or tube-like element and the primary part for sealing the bearing unit against penetrating foreign matter.

7. The electric machine of claim 1, further comprising a plurality of seals, respectively provided between the pin-like or tube-like element and the primary part in an axial direction of the electric machine.

8. The electric machine of claim 4, further comprising a plurality of seals, respectively provided on both sides of the bearing unit between the pin-like or tube-like element and the primary part in an axial direction of the electric machine.

9. The electric machine of claim 1, wherein the primary part of the second machine part has a cooling device.

10. The electric machine of claim 9, wherein the cooling device includes guides for conducting a liquid coolant, said guides being arranged in an interior of the primary part.

11. The electric machine of claim 9, wherein the cooling device includes longitudinal bores extending in an interior of the primary part in an axial direction of the primary part for dissipating heat axially from the primary part.

12. The electric machine of claim 11, wherein the longitudinal bores are interconnected in meandering fashion at end faces of the primary part.

13. The electric machine of claim 9, wherein the cooling device includes heat pipes arranged in an interior of the primary part for dissipating heat axially from the primary part.

14. The electric machine of claim 9, wherein the cooling device includes blind bores extending in an interior of the primary part and respectively including a tube arrangement for allowing introduction of a liquid coolant into the respective blind bore and for removal of the liquid coolant therefrom to dissipate heat axially from the primary part.

15. The electric machine of claim 1, further comprising a housing for enclosing the first and second machine parts, wherein the primary part of the second machine part is annularly fastened to an end face of the housing.

16. The electric machine of claim 1, constructed in the form of a motorized drive device for use in a roller drive device for moving a roller of the roller drive device in rotary and linear fashions.

17. The electric machine of claim 16, wherein the roller drive device is a printing machine.

18. The electric machine of claim 1, constructed in the form of a motorized drive device for use in a machine tool drive device for moving a tool in rotary and linear fashions.

* * * * *